May 17, 1966     A. F. PATON     3,251,495

HAND TRUCK

Filed Oct. 9, 1964     2 Sheets-Sheet 1

INVENTOR.
ALLAN F. PATON
BY
ATTORNEY

May 17, 1966  A. F. PATON  3,251,495

HAND TRUCK

Filed Oct. 9, 1964  2 Sheets-Sheet 2

INVENTOR.
ALLAN F. PATON
BY
ATTORNEY

United States Patent Office 3,251,495
Patented May 17, 1966

3,251,495
HAND TRUCK
Allan F. Paton, 1537 N. La Salle, Indianapolis, Ind.
Filed Oct. 9, 1964, Ser. No. 402,849
4 Claims. (Cl. 214—370)

This invention relates to support means for vehicle mounted structures. More specifically this invention relates to retractable and detachable support means for supporting a removable body, or other like structure, that is mounted on a vehicle. Still more specifically, this invention relates to a support means for a vehicle transported structure that is adapted to be easily assembled into operative position, capable of elevating the structure relative to the vehicle to allow the vehicle to be removed, and subsequently support the structure relative to the ground free of the vehicle. The invention particularly relates to a support means adapted to support a vehicle transported structure relative to the ground that can be easily assembled and/or retracted, stored in a relatively small space, and be put into assembled supporting relation with a minimum amount of effort in a very short time.

Very often it is desirable and necessary that vehicle mounted structures be removed from the vehicle supporting same. An example of such a vehicle mounted structure is a coach, or portable house mounted on the bed of a light truck commonly referred to as a pick-up truck. It is desirable that it be removed from the truck for many reasons, one of which is to make more efficient use of the truck. During travel or camping trips and the like personnel may wish to use the portable house for sleeping, preparing meals, etc. at the same time that it is necessary to use the truck vehicle that normally transported it for other purposes such as fishing expeditions, side trips, etc. The truck can be more easily and efficiently used to bring supplies, take the fishermen or campers to another location for other activities and the like when the coach is removed. In general such portable houses or coaches weigh about 1000 pounds and it generally requires about six men to load or unload such a coach or house from a bed of the vehicle. This number of personnel are not always conveniently available to a camper camped in an inaccessible area. Moreover, even if the required number of personnel are available to remove the portable house from the vehicle or truck, the provision of a suitable support to support the portable house or coach after it has been removed presents problems. Unless the coach is properly supported it will rock, twist causing discomfort to the occupants therein and could become damaged.

Since these portable houses or coaches mounted on a truck are often employed as shelters for campers, fishermen, vacationers, etc. they have become very popular as they do not create driving problems as often are encountered with wheeled or trailer type shelter structures. The major disadvantage in regard to vehicle mounted portable houses is that it is difficult to remove the portable house from the truck and support same. In general, ground support means for such portable houses or coaches are old in the art. These ground support structures have many disadvantages. These structures are often cumbersome and difficult to assemble. The apparatus for supporting the coach or portable house are difficult to store and handle, often weighing a great deal. The most serious disadvantage with present ground support structures known to the art is that they are difficult and time consuming to assemble and put into operation. Conventionally, the coach is elevated to free the truck therefrom. This elevation is normally accomplished by jacking up or raising the coach with a mechanism that is either built into the ground support means, or with a separate automobile type jack. If the lifting mechanism is built into the ground support a separate unit is necessary at each upright support, normally four in number. This, of course, adds weight and cost to the support unit, and entails the expending of a great deal of physical labor during use. If an automobile jack or the like is used it must be moved several times in order to lift the vehicle body uniformly from the vehicle which requires a lot of time and energy. The known support structures are also relatively unstable after the vehicle has been removed. Further, the ground support means for coaches known to the prior art are relatively expensive and difficult to manufacture.

I have invented a new support for a vehicle body or the like. The support of my invention has a plurality of spaced generally upright support means. The lower end of the upright support means are adapted to engage the ground or other surface for support. Mounting means are provided for pivotally securing the upright support means to a vehicle body or the like. Brace means are also preferably provided for maintaining the support means in stable supporting relationship to the vehicle body or the like.

The ground support means of my invention solves all of the problems associated with known support means for vehicle mounted and transported structures, and in particular with the ground support means for portable house or coach type structures mounted on small pick-up type trucks. The support means of my invention is very light in weight and can be stored in a relatively small space. This is important on camping, hunting, fishing trips and the like, since space is often at a premium. The support means of the invention is simple to install and use. This installation and use can be accomplished by a single person in a relatively short time. Further, if desired, the support means can be temporarily retracted and left on the vehicle for relatively short moves as for example to a nearby site. The support means is adjustable to accommodate for minor surface variations. Very important, the support means is adapted to utilize the power source of the engine of the vehicle to lift the coach or other vehicle body from the bed of the vehicle. The erection and operation of any support means does not require the time consuming and strenuous physical exertion to lift the coach from the vehicle normally required in prior art ground support means of this type. After the ground support means has been assembled and erected and the vehicle removed, the coach is mounted in a very stable manner adapted to resist swaying, vibrating, etc. Another important advantage in the ground support means of the invention is that it is relatively inexpensive to produce and therefore can be marketed at a relatively low cost.

An object of this invention is to provide a new ground support means for vehicle mounted structures, and the like.

Another object of this invention is to provide a new support means for vehicle mounted structures that is light in weight and easy to store.

Yet another object of this invention is to provide a ground support means for a vehicle mounted structure that is simple to install and erect.

Still another object of this invention is to provide a ground support means for vehicle transported structures that is adjustable to accommodate for minor surface variations and elevations.

Another object of this invention is to provide a ground support means for a vehicle mounted structure that is adapted to utilize the power source of the engine of the vehicle to lift the coach or the like free of the vehicle.

Still another object of this invention is to provide a ground support means that can be assembled and erected to support a vehicle transported structure free of the vehicle that can be easily and conveniently erected by a single person.

Yet another object of this invention is to provide a ground support means for a vehicle transported structure that is structurally stable and adapted to support the coach or the like without swaying, vibrating, etc.

Still another object of this invention is to provide a ground support means for a vehicle transported structure that can be manufactured at a low cost.

Other objects and advantages of the invention will be apparent to those skilled in the art from the disclosure set forth herein.

Drawings of preferred specific embodiments of the invention accompany and are a part hereof, and such are to be understood to not unduly limit the scope of the invention. In the drawings, FIG. 1 is a side elevation view showing the ground support means of the invention assembled in unsupporting position on a coach or portable house mounted on a pick-up truck type vehicle.

FIG. 6 is a broken detail end elevation view illustrating an upright support means of the invention and its association to the coach being supported.

FIG. 7 is a detail view taken on line 7—7 of FIG. 3.

Figure 1:
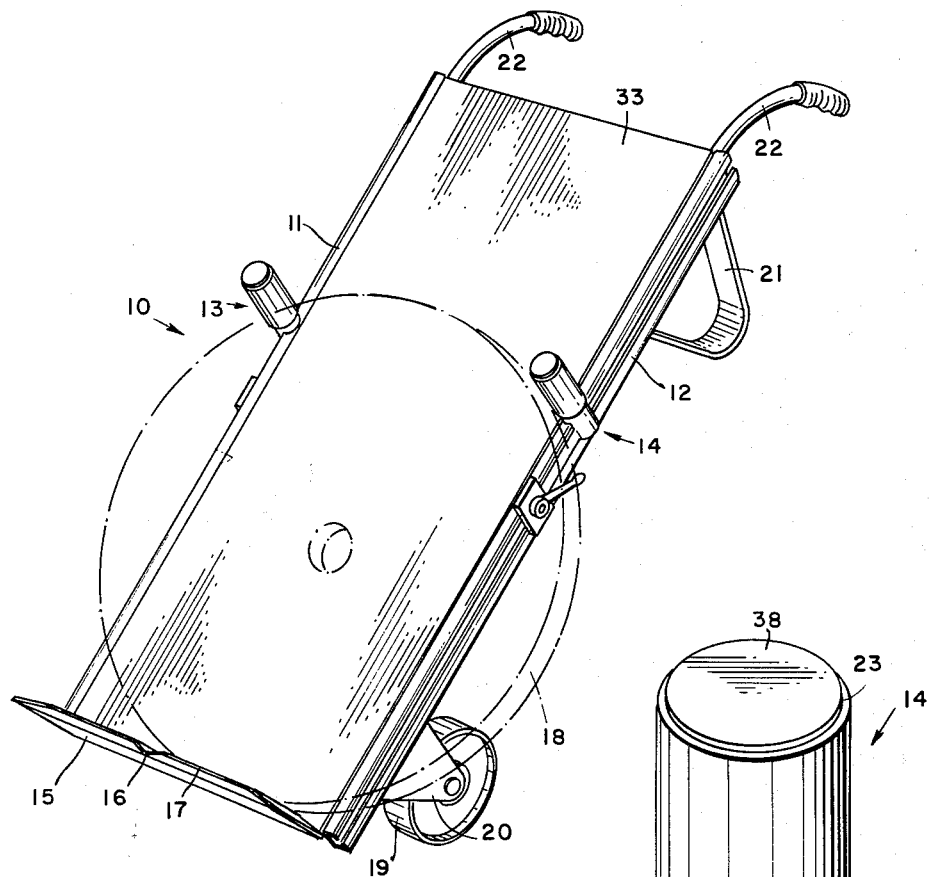

The following is a discussion and description of the new ground support means for vehicle mounted structures of my invention made with reference to the drawings wherein the same reference numerals are used to indicate the same or similar parts and/or structure. The discussion and description are of preferred specific embodiments of the new support means of the invention and it is to be understood that such is not to unduly limit the scope of my invention.

Figure 4:
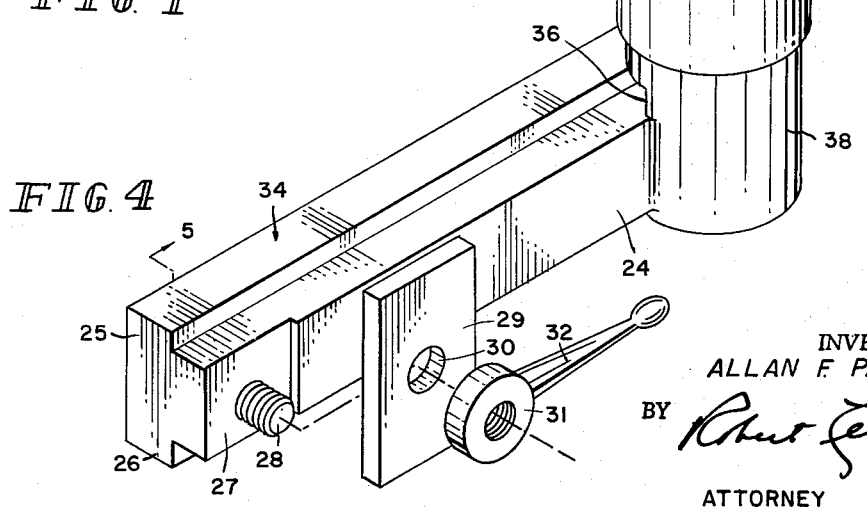
FIG. 4 is an end elevation view of my ground support means completely assembled and in supporting relationship to a coach.
Figure 2:
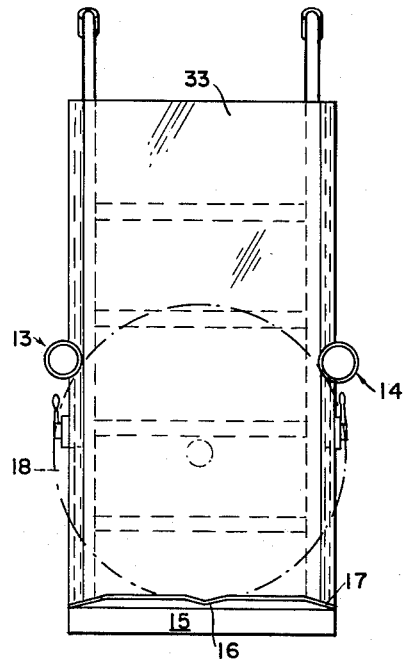
FIG. 2 is a side elevation view of the ground support means of the invention illustrated in supporting relationship to the coach immediately after the coach is lifted free of the vehicle.
Figure 3:
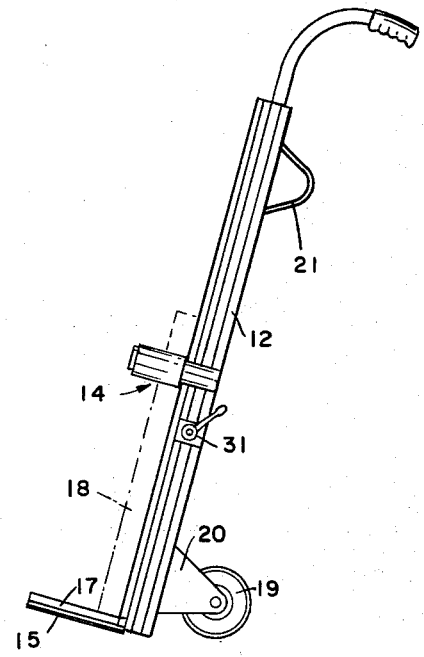
FIG. 3 is a side elevation view of the ground support means of the invention illustrating same in completely assembled relation, including the braces, with the vehicle removed.
Figure 5:
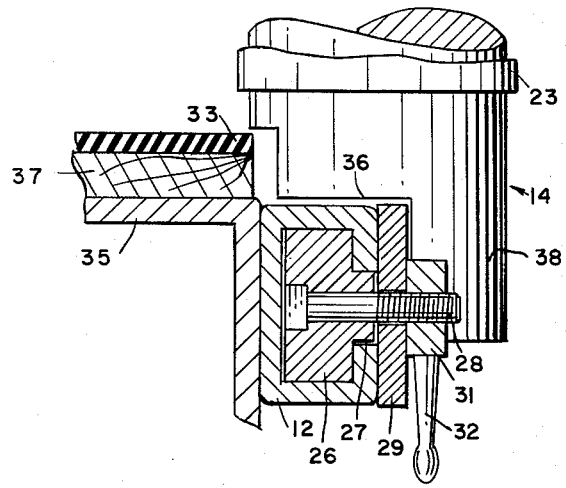
FIG. 5 is a broken detail side elevation view of an upright supporting element of the ground support means of the invention.

Referring now to the drawings, FIGS. 1–7 there is depicted a detachable retractable support means for supporting a removable body of a vehicle on the ground. In FIGS. 1 and 2 there is illustrated a small truck 10 having a coach or small portable house 12 mounted thereon. Coach or house 12 is common to the art and available presently in the United States of America from several manufacturers. The support means of the invention is secured to the coach 12. On coach 12 are provided a first pair of aligned, horizontally extending, protruding preferably tubular members 14 on the front of the vehicle body or coach 12. The protruding members 14 can be secured to the vehicle body in any suitable manner as for example by welding, bolting or by being welded to a plate which in turn is bolted to the coach 12. A second like pair of aligned horizontally extending preferably tubular members 16 are secured to the rear portion of the coach 12. Most desirably the members 14 and 16 are removably mounted in tubular sleeves suitably secured to the bottoms of coach 12, as illustrated most clearly in FIG. 6. Four leg members 18 are detachably and pivotally secured to the first and second pairs of tubular members 14. Each of the leg members 18 has an elongated longitudinally extending preferably tubular shaped body portion 20, and a generally transverse tubular portion 22 suitably secured to the top end of the body portion 20. The tubular portions 22 are disposed over the protruding tubular members 14 and 16 and provide a pivotal mounting for the leg members 18. Preferably, the tubular portions 22 are welded, or otherwise secured to body portion 20 so that the body portion is sloped slightly outwardly as illustrated in FIG. 4. Gussets 23 can be used to strengthen the joint. An extensible portion 24 is telescopingly engaged to the other lower end of the body portion 20 of leg member 18. Suitable apertures 25 are provided in the extensible portion 24 for securing and maintaining the relative relationship between the body member 20 and the extensible member 24. An aperture is also provided on the lower end of body portion 20 for alignment with the apertures 25 in the extensible portion 24. A ground engageable shoe 26 having a broad flat base or surface portion 27 is pivotally mounted on the lower end of the extensible portion 24. The shoe 26 serves as a base to prevent the leg members 18 from sinking into the ground when the load, namely the coach, is applied thereto. The shoe member 26 is suitably secured to the shoe 26 with a bolt means 28 to provide a pivotal relationship therebetween. As is illustrated in FIGS. 1 and 2, the overall length of the leg members 18 is greater than the distance from the protruding member 14 or 16 and the ground. Further, the extensible adjustment of the leg member 18 adapts it to be utilized on a surface that is slightly uneven or possibly sloping. A pair of elongated link elements are pivotally joined to the lower ends of body portions 20 of leg members 18, as illustrated in FIGS. 1, 2 and 3. The length of the link member 30 is greater than the distance between front and rear protruding tubular members 14 and 16 respectively. The link members 30 have an aperture in each end thereof which can be used to pivotally join the link to the bolt 32 in leg member 18. Bolt 32 is also used to control the relative relationship between the body portion 20 and the extensible portion 24 of the leg. A suitable coupling means 34 is provided in link member 30 to enable it to be adjusted in length. However any other means can be provided for varying the length of link members 30. A pair of cables 36 are also provided to limit the pivotal movement of the leg members 18. The cable means has one end secured to a ring 35 slipped over protruding element 16. However the cable can be secured directly to coach 12 if desired. Means is provided to secure the other end of cable 36 to leg 18, preferably to the first aperture 25 below the lower end of portion 20. A illustrated in FIG. 3, the length of the link 30 is such as to allow the leg members 18 to assume a slight outward canted position. The length of the cable means 36 is such as to allow pivotal movement of the leg members 18 to this position from one direction of rotation and restrain further movement beyond it in the same direction. This position of the leg members is a relatively stable position. In order to upset this stable position the coach must be lifted slightly, as for example, by pivoting the legs 18 relative to the coach in direction not restrained by the cable 36. A means is provided to vary the length of cable 36. This means can be any suitable means as for example the turnbuckle 38. A first set of four detachable braces 40 are provided. This set of braces is provided to lend stability to the ground support means to prevent pivotal movement of the leg members 18 relative to the protruding support members 14 and 16. As shown in FIG. 3 one end of each of the diagonal braces 40 is secured to the coach 12 at a point intermediate the protruding tubular members 14 and 16. A bolt 39 is slidaby disposed in channel 41 with the threaded portion protruding. The end of bolt 39 is disposed in the aperture in brace 40 to thereby secure same to the coach 12. The other end of the brace 40 is secured to the lower end portion of leg 18. Preferably brace 40 is provided with an aperture which is also disposed about bolt 32. Braces 40 are generally disposed in the plane defined by the front and rear leg members 18 mounted on one side of the coach 12. A second set of four detachable diagonal braces 42 are provided to lend transverse stability to the support means. The braces 42 are in general disposed in the plane defined by the front two leg members 18 mounted on protruding supports 14, or the rear two leg members 18 mounted on protruding supports 16. As illustrated in FIG. 4, each brace 42 has one end secured to the coach 12, and the opposite end secured to the lower portion of a leg member 18. Preferably brace members 42 each have apertures on each end and are bolted in the respective position. The brace member 42 preferably has an aperture on one end which has bolt means 32 disposed therein thereby securing it along with brace 40 and link 30 to the lower end of body portion 20 of leg member 18.

In operation, the support means of my invention is assembled and erected whenever it is desired to separate the coach 12 from the vehicle 10. In order to utilize the ground support means of my invention, the leg members 18 are disposed over the protruding members 14 and 16. The protruding members 14 and 16 are most desirably removed from coach 12 during non-use by sliding same from the tubular mounts. Members 14 and 16 can be easily inserted when the support means is assembled. Thereafter, the link members 30 are pivotally connected to the respective leg members 18. If the ground is sloped or uneven the extensible portions 24 can be adjusted at this time to accommodate same. The bolt 32 is disposed in the leg member and link members preferably with the nut toward the inside as illustrated in the drawings. Thereafter the cable 36 is secured in the position shown in FIGS. 1, 2 and 3, namely to the coach body and to the shoes of leg member 18. When the link members 30 and cable 36 have been assembled the vehicle 10 is slowly and cautiously backed up to pivot the leg members 18 relative to the coach 12. In pivoting the leg members, the coach 12 is gently lifted or cammed upwardly from the bed of vehicle 12. When the links 30 and cables 36 have been properly adjusted in length, the leg members 18 will be canted outwardly to thereby stablize the poistion of the coach 12. This is in a relatively stable position as explained hereinbefore. However, the braces 40 are preferably assembled before the vehicle is driven from beneath the coach. After the vehicle is driven from beneath the coach the braces 42 are assembled. Upon assembling the braces 40 and 42, the coach 12 is very stably supported on the support means. The coach 12 can thereafter be utilized as a housing, and a vehicle 10 used for any suitable purpose apart from the coach 12.

In disassembling the support means and re-mounting the coach 12 on vehicle 10, the order of the steps is reversed. If desired, after the braces 40 and 42 are removed and the vehicle driven beneath the coach, the coach can be connected to the vehicle. When the vehicle is driven ahead the coach will be gently lowered on same.

It can be seen that the coach 12 can be very easily, quickly and conveniently removed from the vehicle 12 and supported in a very stable manner by a single person. Further the assembly and erection and disassembly of the support means is a very simple and easy job easily accomplished by a single person if necessary.

Various changes can be made in the support means of my invention. As for example the leg members, base members, etc. can be made of tubular stock as shown or any other suitable type of structural material. The legs 18 can be made so that they have more or less outward taper.

While I have described and illustrated preferred embodiments of my invention, it is to be understood that the support means disclosed can be made in other forms than herein described and suggested without departing from the spirit of my invention.

I claim:

1. A removable body of a vehicle and detachable retractable support means therefor for supporting said removable body of a vehicle in detached position on the ground comprising, a first pair of aligned horizontally extending tubular members on the front portion of a vehicle body protruding from the sides thereof, a second pair of aligned horizontally extending tubular members on the rear portion of a vehicle body protruding from the sides thereof and positioned parallel to said first pair of tubular members, four leg members detachably and pivotally mounted on said first and second pairs of tubular members, each of said leg members having an elongated longitudinally extending tubular shaped body portion, a generally transverse tubular portion secured to one end of said body portion and disposable over a tubular member on the vehicle body, an extensible portion telescopingly engaged in the other end to said body portion, a bolt means disposed in aligned apertures in said body portion and extensible portion for maintaining said body portion and said extensible portion in rigid extended supporting relationship, a ground engageable shoe, and a bolt means for pivotally securing said shoe to the protruding end of said extensible portion, a pair of elongated link elements of a length greater than the longitudinal distance between said first and second tubular members on the vehicle body, said link elements having apertures on each end to accept said bolt means to pivotally secure same to said other ends of said body portions of said leg members, a pair of cables, means on one end of each cable to secure same to the second tubular member on the vehicle body, means on the other end of each of said cables to secure same to the extensible portion of the leg member pivoted to one of said first tubular members on said vehicle body, a turnbuckle in each of said cables, a first set of four detachable diagonal braces, each of said braces having an aperture on one end to secure same to said bolt means of an associated leg member, and a means to adjustably secure the opposite end of said last mentioned brace to the vehicle body at a point between a first and a second tubular member to thereby provide longitudinal stability, a second set of four detachable diagonal braces, each of said braces having an aperture to secure same to a bolt means of an associated leg member, and a means on the opposite end of each brace to secure same to the vehicle body at a point spaced inwardly from the sides thereof to provide transverse stability, said support means adapted to be readily assembled on a vehicle body, lift the vehicle body from the vehicle, and subsequently support the vehicle body on the ground.

2. A removable body of a vehicle and detachable support means therefor for supporting said removable body of a vehicle in detached position on the ground, comprising, a first pair of aligned horizontally extending protruding members on the front portion of a vehicle body, a second pair of aligned horizontally extending protruding members on the rear portion of a vehicle body parallel to said first pair of members, four leg members pivotally secured to said first and second pairs of protruding members, each of said leg members having an elongated body portion, a generally transverse apertured portion secured to one end of said body portion and disposed on a protruding member, an extensible portion engaged to the other end of said body portion, a means for maintaining said body portion and said extensible portion in rigid supporting relationship, a ground engageable shoe, and a means for pivotally securing said shoe to the protruding end of said extensible portion, a pair of link elements of a length greater than the longitudinal distance between said first and second protruding members on the vehicle body, means on each end of each of said link elements to pivotally connect same to a body portion of a leg member, a pair of cables, means on one end of each cable to secure same a protruding member, means on the other end of each of said cables to secure same to a leg member, a means with each of said cables to adjust the length thereof, a first set of detachable diagonal brace means, means on one end of each of said brace means to secure same to a leg member, and a means on the opposite end of each of said brace means to adjustably secure same to the vehicle body, a second set of detachable diagonal brace means, means on one end of each one of said second set of brace means to secure same to a leg member, and a means on the opposite end of each brace means to secure same to the vehicle body at a point spaced inwardly from the sides, said second set of brace means providing stability in a direction transverse from said first set of brace means, said support means adapted to be readily assembled on a vehicle body and thereafter raise the vehicle body from the vehicle when the vehicle is moved relative to the ground, and subsequently support the vehicle body free of the vehicle.

3. A removable body of a vehicle and support means therefor for supporting said removable body of a vehicle in detached position on the ground, comprising, a pair of pivotal front upright support means, a pair of pivotal rear upright support means, mounting means on said vehicle for pivotally securing said front and rear upright support means thereto, shoe means pivotally mounted on the lower ends of each of said support means, a pair of link means of a length slightly in excess of the distance between the mounting means of said front and said rear support means, each of said link means pivotally secured to the lower end of a front and a rear upright support means, a pair of cable means, each of said cable means secured at one end to the vehicle body and at the other end to the lower portion of an upright support means, a first set of diagonal brace means, means on each end of said brace means to secure same to the vehicle body and a means on the opposite end to secure same to the lower portion of an associated upright support means, said first set of brace means adapted to prevent pivoting of said upright support means, a second set of diagonal brace means, each brace secured at one end to the vehicle body and at the other end to an associated upright support means, said second set of brace means adapted to provide stability of said upright support means in a generally transverse direction, said support means adapted to be readily assembled on the vehicle body, raise the vehicle body relative to the vehicle, and subsequently support same on the ground thereof.

4. A removable body of a vehicle and support means therefor for supporting said removable body of a vehicle in detached position on the ground, comprising, front upright support means having a plurality of pivotal upright support members, rear upright support means having a plurality of pivotal upright support members, mounting means on said vehicle for pivotally securing said front and rear upright support means thereto, ground engaging means pivotally mounted on the lower end portions of said support means, a link means of a length slightly in excess of the distance between the mounting means of said front and rear support means, said link means pivotally secured to a front and a rear upright support member in a lower portion thereof, a cable-like means, said cable-like means secured at one end portion to the vehicle body and in the other end portion to an upright support member in the lower portion thereof, first diagonal brace means, means on one end portion of said brace means to secure same to the vehicle body and means on the opposite end portion to secure same to an associated upright support member in the lower portion thereof, said first brace means adapted to prevent pivoting of said upright support member, second diagonal brace means secured in one end portion to the vehicle body and at the other end portion to an associated upright support member, said second brace means adapted to provide stability of said upright support means in a generally transverse direction, said support means adapted to be readily assembled on the vehicle body, raise the vehicle body relative to the vehicle, and subsequently support same on the ground.

References Cited by the Examiner

UNITED STATES PATENTS

| | | | |
|---|---|---|---|
| 416,519 | 12/1889 | Troxell | 214—515 X |
| 1,048,722 | 12/1912 | Morgan | 254—45 |
| 2,983,394 | 5/1961 | McKee | 214—515 |
| 3,096,065 | 7/1963 | Horne. | |
| 3,155,373 | 11/1964 | Rae | 254—45 |

FOREIGN PATENTS

| | | |
|---|---|---|
| 1,067,324 | 1/1954 | France. |
| 1,181,988 | 1/1959 | France. |
| 456,259 | 11/1936 | Great Britain. |
| 696,728 | 9/1953 | Great Britain. |

GERALD M. FORLENZA, *Primary Examiner.*